(12) United States Patent
Reagan et al.

(10) Patent No.: US 12,078,063 B2
(45) Date of Patent: Sep. 3, 2024

(54) SYSTEM FOR DRILLING A DIRECTIONAL WELL

(71) Applicant: Schlumberger Technology Corporation, Sugar Land, TX (US)

(72) Inventors: Olivia Reagan, Katy, TX (US); Adrien Chassard, Houston, TX (US); Cesar Pena, Katy, TX (US); Jinsoo Kim, Houston, TX (US); Rodney Ewing, Katy, TX (US); James Foley, Katy, TX (US); Conie Chiock, Katy, TX (US); Ginger Hildebrand, Houston, TX (US); Jason Bryant, Katy, TX (US); Chunling Gu Coffman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 314 days.

(21) Appl. No.: 17/754,485

(22) PCT Filed: Oct. 2, 2020

(86) PCT No.: PCT/US2020/070613
§ 371 (c)(1),
(2) Date: Apr. 4, 2022

(87) PCT Pub. No.: WO2021/068005
PCT Pub. Date: Apr. 8, 2021

(65) Prior Publication Data
US 2023/0279727 A1    Sep. 7, 2023

Related U.S. Application Data

(60) Provisional application No. 62/909,688, filed on Oct. 2, 2019.

(51) Int. Cl.
*E21B 7/04* (2006.01)
*E21B 44/00* (2006.01)
(Continued)

(52) U.S. Cl.
CPC ............. *E21B 7/04* (2013.01); *E21B 44/00* (2013.01); *E21B 47/02* (2013.01); *E21B 47/022* (2013.01);
(Continued)

(58) Field of Classification Search
CPC .......... E21B 44/00; E21B 47/02; E21B 47/13; E21B 47/26; E21B 47/022; E21B 47/09;
(Continued)

(56) References Cited

U.S. PATENT DOCUMENTS

| 11,421,520 B2 * | 8/2022 | Zaripov | E21B 7/04 |
| 2003/0024738 A1 * | 2/2003 | Schuh | E21B 7/04 175/45 |

(Continued)

FOREIGN PATENT DOCUMENTS

| CA | 2607006 A1 * | 11/2006 | E21B 44/00 |
| WO | WO-02099241 A2 * | 12/2002 | E21B 7/04 |

(Continued)

OTHER PUBLICATIONS

Search Report and Written Opinion of International Patent Application No. PCT/US2020/070613 dated Jan. 27, 2021, 12 pages.
(Continued)

*Primary Examiner* — Ronald D Hartman, Jr.
(74) *Attorney, Agent, or Firm* — Jeffrey D. Frantz

(57) ABSTRACT

Methods, drilling systems, and computer-readable media for evaluating candidate correctional trajectories for a directional drilling well. If the user wishes to investigate alternatives trajectories or trajectories to get a BHA back to a planned trajectory, the computing system allows the user to
(Continued)

enter one or more intermediate targets. The computing system generates drilling parameters for the alternative targets and displays them to the user. The user can adjust parameters and intermediate targets, as well as drilling parameters, to investigate a range of possible solutions before selecting an update to the planned trajectory.

20 Claims, 7 Drawing Sheets

(51) Int. Cl.
    *E21B 47/02*     (2006.01)
    *E21B 47/022*     (2012.01)
    *E21B 47/09*     (2012.01)
    *E21B 47/13*     (2012.01)
    *E21B 47/26*     (2012.01)
    *G05B 15/02*     (2006.01)
    *G05B 19/10*     (2006.01)

(52) U.S. Cl.
    CPC .............. *E21B 47/09* (2013.01); *E21B 47/13* (2020.05); *E21B 47/26* (2020.05); *G05B 15/02* (2013.01); *G05B 19/106* (2013.01); *G05B 2219/25067* (2013.01)

(58) Field of Classification Search
    CPC ................. E21B 7/04; G05B 19/106; G05B 2219/25067; G05B 15/02
    USPC .......................................................... 700/275
    See application file for complete search history.

(56) References Cited

U.S. PATENT DOCUMENTS

| | | | |
|---|---|---|---|
| 2009/0288881 A1* | 11/2009 | Mullins | E21B 47/022 175/50 |
| 2013/0032401 A1* | 2/2013 | Edbury | E21B 44/00 175/24 |
| 2016/0290117 A1* | 10/2016 | Dykstra | G06F 30/20 |
| 2017/0328192 A1* | 11/2017 | Wessling | E21B 47/024 |
| 2019/0024495 A1* | 1/2019 | Wise | G06F 30/20 |
| 2019/0048706 A1* | 2/2019 | Benson | E21B 44/04 |
| 2019/0284921 A1* | 9/2019 | Xue | E21B 47/024 |
| 2021/0025269 A1* | 1/2021 | Zaripov | E21B 45/00 |

FOREIGN PATENT DOCUMENTS

| | | | | |
|---|---|---|---|---|
| WO | WO-2010039317 A1 * | 4/2010 | ........... | E21B 47/022 |
| WO | 2014091461 A1 | 6/2014 | | |
| WO | WO-2016043724 A1 * | 3/2016 | ............. | E21B 44/00 |
| WO | 2016168596 A1 | 10/2016 | | |
| WO | 2016168617 A1 | 10/2016 | | |
| WO | 2016168622 A1 | 10/2016 | | |
| WO | 2016172006 A1 | 10/2016 | | |
| WO | WO-2017180124 A1 * | 10/2017 | ......... | E21B 41/0092 |
| WO | WO-2017180157 A1 * | 10/2017 | ............. | E21B 44/00 |
| WO | 2019051435 A1 | 3/2019 | | |
| WO | WO-2021068005 A1 * | 4/2021 | ........... | E21B 47/022 |

OTHER PUBLICATIONS

Extended Search report issued in European Patent Application No. 20872920.2 dated Aug. 8, 2023, 7 pages.

* cited by examiner

SYSTEM FOR DRILLING A DIRECTIONAL WELL

CROSS-REFERENCE TO RELATED APPLICATIONS

This application is a National Stage Entry of PCT Application No. PCT/US2020/070613, filed on Oct. 2, 2020, which claims priority from U.S. Provisional Application No. 62/909,688 filed on Oct. 2, 2019, the specification of which is incorporated herein by reference.

BACKGROUND

Unless otherwise indicated, this section does not describe prior art to the claims and is not admitted prior art.

As energy reserves become increasingly challenging to reach, drillers have had to expand their technologies and methods beyond vertical wells. Directional drilling has become an important tool for drillers and operators to effectively reach and produce reserves. While most wells begin with a vertical wellbore, in directional drilling the directional driller deflects the well path at a designated depth (commonly referred to as the kick off point (KOP) and steers the well in a non-vertical directional. Directional drilling can be used to sidetrack wells, reach offshore targets, drill relief wells, drill horizontal wells, and other types of wells that include a non-vertical section.

The directional driller makes use of a range of technologies to steer the well. Components may be added to the bottom hole assembly (BHA) to allow the directional driller to control the position of the BHA and, as a result, the well path being created using the BHA. For example, motors may be used with a bent motor housing in the BHA to steer the BHA by alternating intervals of sliding and rotating. Rotary steerable systems (RSSs) can also be used to steer the BHA. Other advances (such as hybrid RSSs) can also be used to direct the BHA and create a directional well.

Prior to beginning to drill a well, a team usually creates a directional drilling well plan. A well plan is the description of proposed wellbore, which description will be used by the drilling team in drilling the well. The well plan typically includes information about the shape, orientation, depth, completion, and evaluation along with information about the equipment to used, actions to be taken at different points in the well construction process, and other information the team planning the well believes will be relevant to the team drilling the well.

The position of the BHA, and thus the path of the well, is typically measured at various points during creation of the well and compared to the expected position of the BHA as per the planned trajectory specified in the well plan. When the position of the BHA is off the planned trajectory, software supporting the directional drilling effort may generate and propose a correctional trajectory to move the BHA from its current position to the planned trajectory.

Given that the directional driller generally has substantial experience in drilling directional wells, the directional driller may not want to use the generated correctional trajectory. What is needed is a system and method that allows the directional driller to effectively explore additional options before deciding how to get back to the planned trajectory.

SUMMARY

Disclosed herein is a drilling system that includes a drillstring with a bottom hole assembly (BHA) for drilling a well and a computing system. The computing system includes processing and memory storage capacity and can store and execute instructions. The computing system may include instructions for receiving a directional drilling well plan for the well. The well plan includes a set of instructions to reach a target location for the well using the drilling system and a planned trajectory to reach the target location. The computing system also receives BHA position data from sensors during construction of the well; for example, it may receive survey data for the BHA and continuous position data for the BHA.

The computing system may determine the current position of the BHA using the BHA position data and compare it to the planned trajectory; if the current position of the BHA is off the planned trajectory by a threshold amount the computing system may receive, from a user, an intermediate target and create a candidate correctional trajectory that passes through the intermediate target. The computing system may also calculate drilling parameters to reach the intermediate target and present the drilling parameters for the candidate correctional trajectory to the user in editable format.

If the user edits the drilling parameters, the computing system may calculate an updated position for the intermediate target using the edited drilling parameters and displaying the updated position to the user. The user is also presented with the option to select the candidate correctional trajectory and, if selected, to update the well plan using the selected candidate correctional trajectory.

This document also discusses a non-transitory computer-readable medium storing instructions that, when executed by a processor, cause the processor to perform operations. These operations may include receiving a well plan that includes one or more target locations for a well to be directionally drilled and receiving positional data for a BHA during construction of the well.

The operations may also include receiving, from a user, an intermediate target and creating a candidate correctional trajectory that passes through the intermediate target specified by the user. The candidate correctional trajectory may include one or more drilling parameters to reach the intermediate target.

The operations may also include presenting the drilling parameters for the candidate correctional trajectory to the user in editable format and, if edits are received, calculating an updated position for the intermediate target using the edited drilling parameters and displaying the updated position to the user.

The operations may also involve providing the user an option to select the candidate correctional trajectory and updating the well plan using the selected candidate correctional trajectory.

This summary introduces some of the concepts that are further described below in the detailed description. Other concepts and features are described below. The claims may include concepts in this summary or other parts of the description.

BRIEF DESCRIPTION OF THE DRAWINGS

The figures below are not necessarily to scale; dimensions may altered to help clarify or emphasize certain features.

DETAILED DESCRIPTION

Introduction

Figure 1:
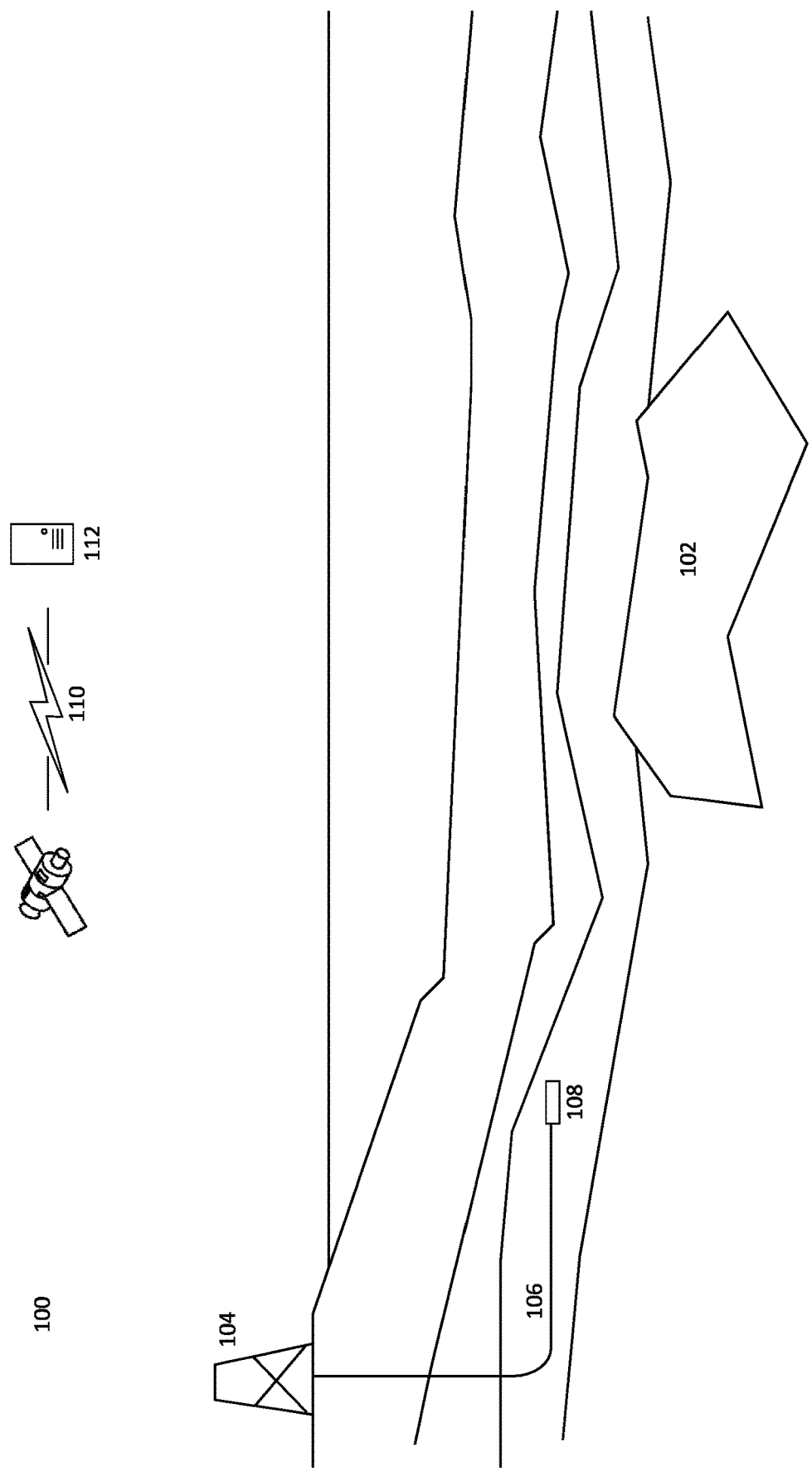
FIG. 1 illustrates an example of an environment in which drilling may take place.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Although the terms "first", "second", etc. may be used herein to describe various elements, these terms are used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Embodiments

FIG. 1 illustrates one example of an environment 100 in which drilling may occur. The environment may include a reservoir 102 and various geological features, such as stratified layers. The geological aspects of the environment 100 may contain other features such as faults, basins, and others. The reservoir 102 may be located on land or offshore.

The environment 100 may be outfitted with sensors, detectors, actuators, etc. to be used in connection with the drilling process. FIG. 1 illustrates equipment 104 associated with a well 106 being constructed using downhole equipment 108. The downhole equipment 108 may be, for example, part of a bottom hole assembly (BHA). The BHA may be used to drill the well 106. The downhole equipment 108 may communicate information to the equipment 104 at the surface, and may receive instructions and information from the surface equipment 104 as well. The surface equipment 104 and the downhole equipment 108 may communicate using various communications techniques, such as mud-pulse telemetry, electromagnetic (EM) telemetry, or others depending on the equipment and technology in use for the drilling operation.

The surface equipment 104 may also include communications means to communicate over a network 110 to remote computing devices 112. For example, the surface equipment 104 may communicate data using a satellite network to computing devices 112 supporting a remote team monitoring and assisting in the creation of the well 106 and other wells in other locations. Depending on the communications infrastructure available at the wellsite, various communications equipment and techniques (cellular, satellite, wired Internet connection, etc.) may be used to communicate data from the surface equipment 104 to the remote computing devices 112. In some embodiments, the surface equipment 104 sends data from measurements taken at the surface and measurements taken downhole by the downhole equipment 108 to the remote computing devices 112.

During the well construction process, a variety of operations (such as cementing, wireline evaluation, testing, etc.) may also be conducted. In such embodiments, the data collected by tools and sensors and used for reasons such as reservoir characterization may also be collected and transmitted by the surface equipment 104.

In FIG. 1, the well 106 includes a substantially horizontal portion (e.g., lateral portion) that may intersect with one or more fractures. For example, a well in a shale formation may pass through natural fractures, artificial fractures (e.g., hydraulic fractures), or a combination thereof. Such a well may be constructed using directional drilling techniques as described herein. However, these same techniques may be used in connection with other types of directional wells (such as slant wells, S-shaped wells, deep inclined wells, and others) and are not limited to horizontal wells.

Figure 2:
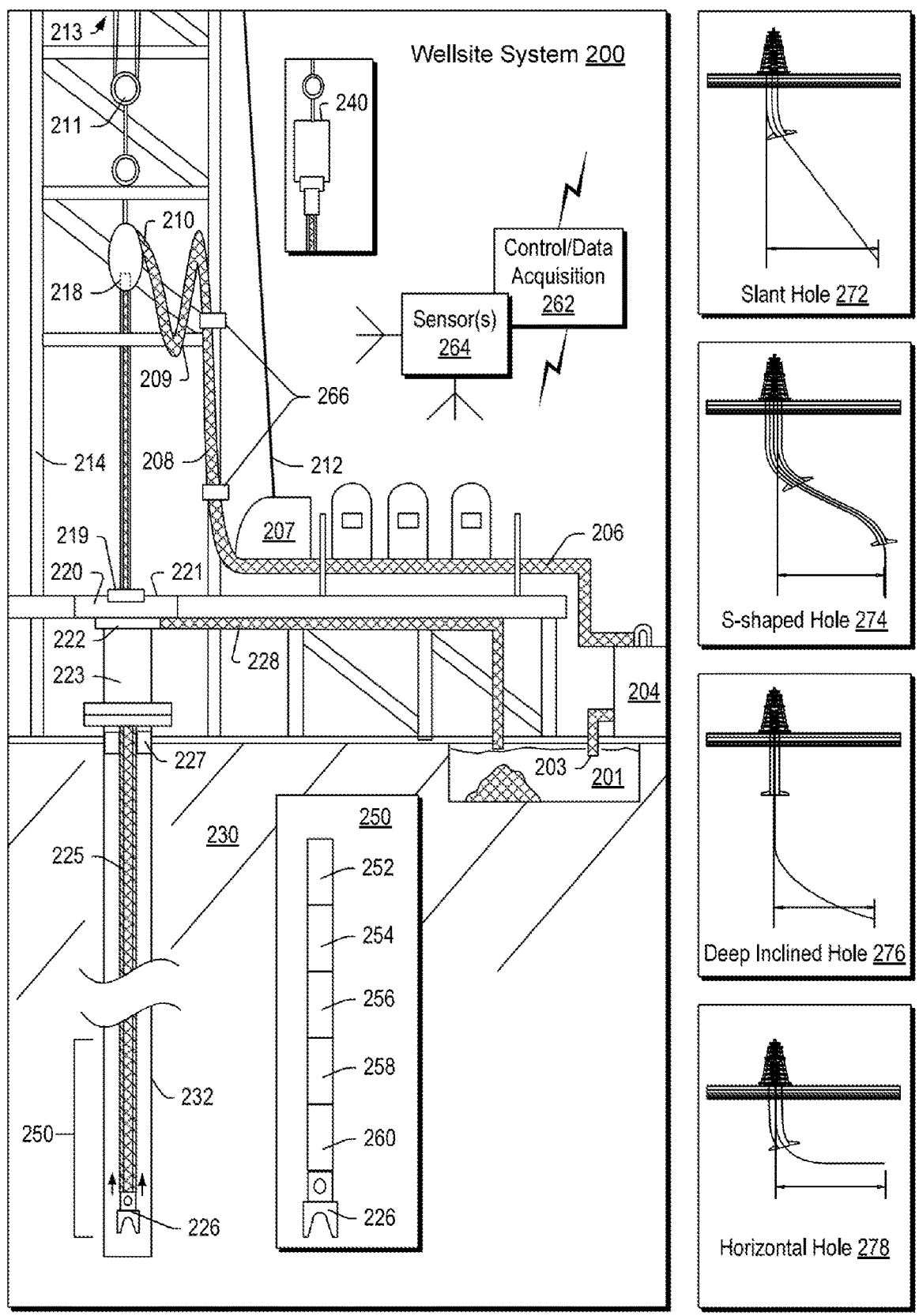
FIG. 2 illustrates an example of a drilling system that can be used to drill a well.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
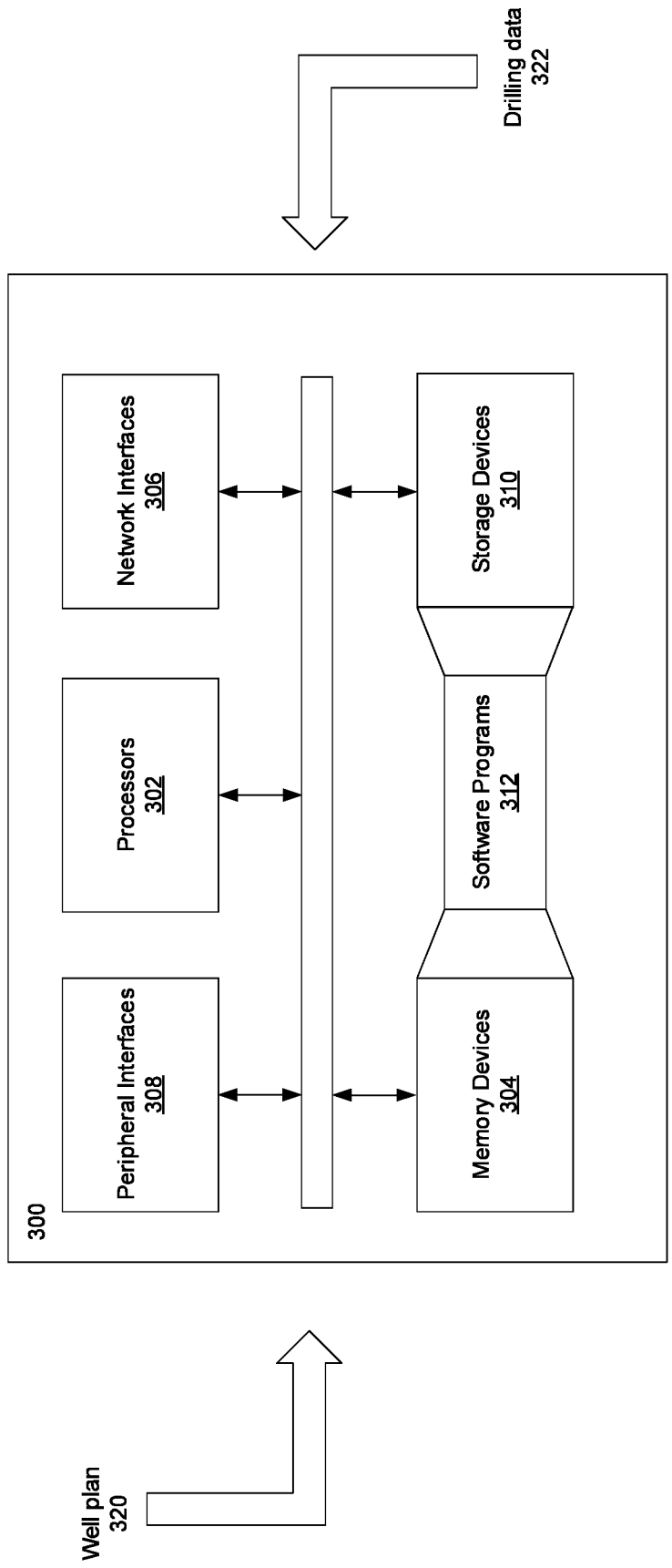
FIG. 3 illustrates an example computing system that may be used in connection with the drilling system.

FIG. 3 illustrates a schematic view of such a computing or processor system 300, according to an embodiment. The processor system 300 may include one or more processors 302 of varying core configurations (including multiple cores) and clock frequencies. The one or more processors 302 may be operable to execute instructions, apply logic, etc. It will be appreciated that these functions may be provided by multiple processors or multiple cores on a single chip operating in parallel and/or communicably linked together. In at least one embodiment, the one or more processors 302 may be or include one or more GPUs.

The processor system 300 may also include a memory system, which may be or include one or more memory devices and/or computer-readable media 304 of varying physical dimensions, accessibility, storage capacities, etc. such as flash drives, hard drives, disks, random access memory, etc., for storing data, such as images, files, and program instructions for execution by the processor 302. In an embodiment, the computer-readable media 304 may store instructions that, when executed by the processor 302, are configured to cause the processor system 300 to perform operations. For example, execution of such instructions may cause the processor system 300 to implement one or more portions and/or embodiments of the method(s) described above.

The processor system 300 may also include one or more network interfaces 306. The network interfaces 306 may include any hardware, applications, and/or other software. Accordingly, the network interfaces 306 may include Ethernet adapters, wireless transceivers, PCI interfaces, and/or serial network components, for communicating over wired or wireless media using protocols, such as Ethernet, wireless Ethernet, etc.

As an example, the processor system 300 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 300 may further include one or more peripheral interfaces 308, for communication with a display, projector, keyboards, mice, touchpads, sensors, other types of input and/or output peripherals, and/or the like. In some implementations, the components of processor system 300 need not be enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 304 may be physically or logically arranged or configured to store data on one or more storage devices 310. The storage device 310 may include one or more file systems or databases in any suitable format. The storage device 310 may also include one or more software programs 312, which may contain interpretable or executable instructions for performing one or more of the disclosed processes. When requested by the processor 302, one or more of the software programs 312, or a portion thereof, may be loaded from the storage devices 310 to the memory devices 304 for execution by the processor 302.

Those skilled in the art will appreciate that the above-described componentry is merely one example of a hardware configuration, as the processor system 300 may include any type of hardware components, including any accompanying firmware or software, for performing the disclosed implementations. The processor system 300 may also be implemented in part or in whole by electronic circuit components or processors, such as application-specific integrated circuits (ASICs) or field-programmable gate arrays (FPGAs).

The processor system 300 may be configured to receive a directional drilling well plan 320. As discussed above, a well plan is to the description of the proposed wellbore to be used by the drilling team in drilling the well. The well plan typically includes information about the shape, orientation, depth, completion, and evaluation along with information about the equipment to be used, actions to be taken at different points in the well construction process, and other information the team planning the well believes will be relevant/helpful to the team drilling the well. A directional drilling well plan will also include information about how to steer and manage the direction of the well.

The processor system 300 may be configured to receive drilling data 322. The drilling data 322 may include data collected by one or more sensors associated with surface equipment or with downhole equipment. The drilling data 322 may include information such as data relating to the position of the BHA (such as survey data or continuous position data), drilling parameters (such as weight on bit (WOB), rate of penetration (ROP), torque, or others), text information entered by individuals working at the wellsite, or other data collected during the construction of the well.

In one embodiment, the processor system 300 is part of a rig control system (RCS) for the rig. In another embodiment, the processor system 300 is a separately installed computing unit including a display that is installed at the rig site and receives data from the RCS. In such an embodiment, the software on the processor system 300 may be installed on the computing unit, brought to the wellsite, and installed and communicatively connected to the rig control system in preparation for constructing the well or a portion thereof.

In another embodiment, the processor system 300 may be at a location remote from the wellsite and receives the drilling data 322 over a communications medium using a protocol such as well-site information transfer specification or standard (WITS) and markup language (WITSML). In such an embodiment, the software on the processor system 300 may be a web-native application that is accessed by users using a web browser. In such an embodiment, the processor system 300 may be remote from the wellsite where the well is being constructed, and the user may be at the wellsite or at a location remote from the wellsite.

Figure 4:
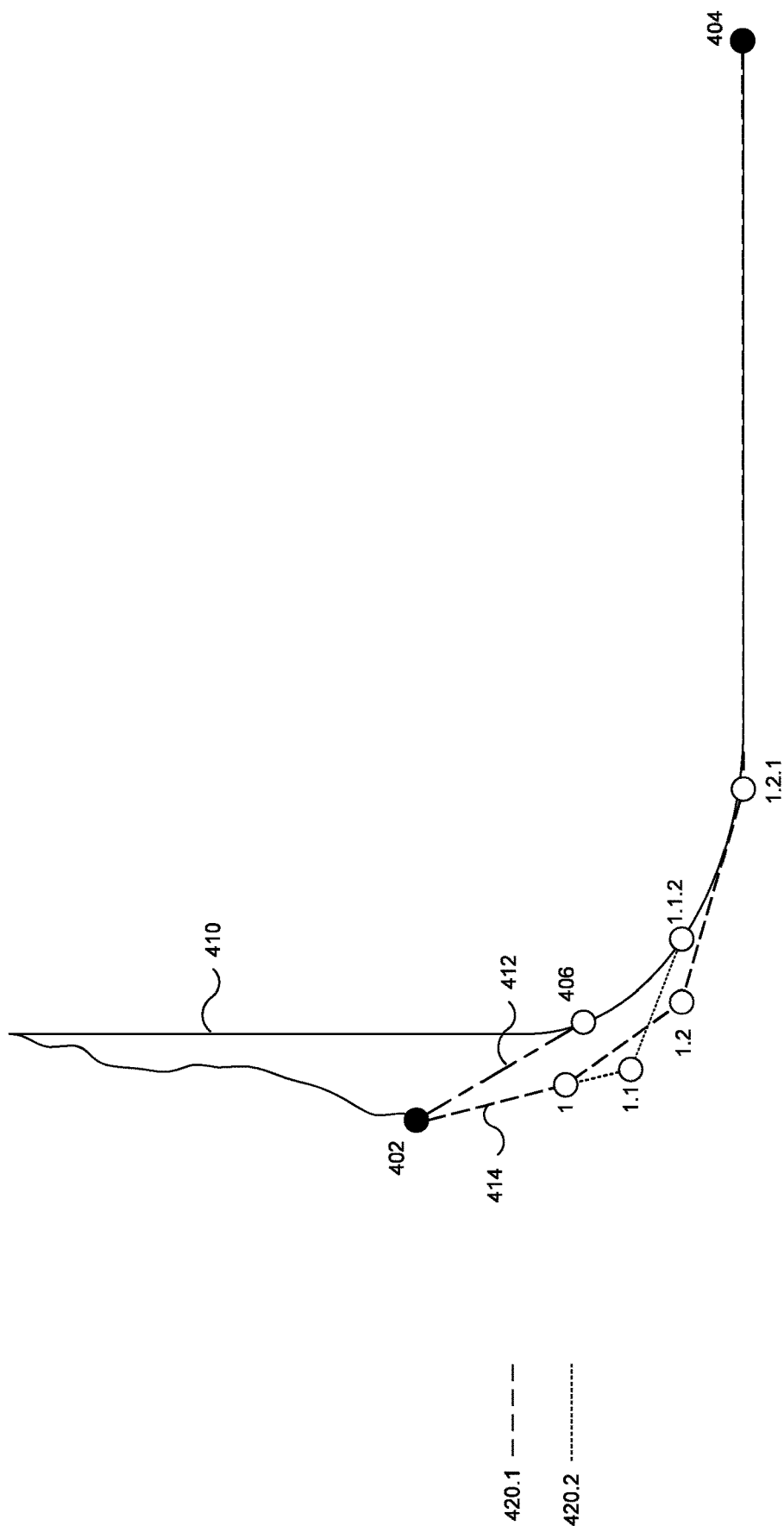
FIG. 4 illustrates an example of a way to evaluate options for returning a BHA to a planned trajectory.

FIG. 4 illustrates an example of a way to evaluate options for returning a BHA to a planned trajectory. FIG. 4 illustrates a planned trajectory 410 for a well. The planned trajectory 410 is typically included as part of the well plan for the well, and is accompanied by a set of instructions for reaching a target location 404 for the well using the drilling system such as the one illustrated in FIG. 2. While the illustration in FIG. 4 shows one target location 404 specified in the well plan, a well plan may specify multiple target locations.

A computing system, such as the one discussed in connection with FIG. 3, may be configured to receive BHA position data from one or more sensors during construction of the well. For example, in drilling a directional well the drilling team may take survey measurements at increments. In certain embodiments, the BHA may include components to take continuous positional measurements and generate continuous positional data for the BHA. Using this BHA position data, the computing system may determine a current position 402 of the BHA.

The computing system may compare the current position 402 of the BHA with the planned trajectory 410. While a certain degree of deviation from the planned trajectory 410 may be acceptable, the computing system may have a threshold value to identify when corrective action is appropriate. In certain embodiments, in response to determining that the current position 402 of the BHA is off the planned trajectory 410 by a threshold amount (as illustrated in FIG. 4), the computing system may notify one or more users and require corrective action.

In one embodiment, the computing system may automatically create a generated correctional trajectory (such as generated correctional trajectory 412) to move the BHA from the current position to the planned trajectory. In the embodiment shown in FIG. 4, the generated correctional trajectory 412 returns the BHA to the planned trajectory at a point 406. Various approaches and software solutions for automatically creating a generated correctional trajectory 412 are known in the art. The computing system may present the generated correctional trajectory 412 to one or more users for review and acceptance. The computing system may, for example, present the generated correctional trajectory 412 to a directional drilling team at the wellsite, one or more specialists supporting the well construction from a remote location, a representative for the operator, or others.

While the generated correctional trajectory 412 may be the best option to return the BHA to the planned trajectory 410, a directional drilling team may want to use a different trajectory or explore different possible trajectories to return to the planned trajectory 410. The directional drilling team may want to modify certain aspects of the generated correctional trajectory 412.

The computing system may be configured to facilitate investigation of alternative correctional trajectories. In the embodiment shown in FIG. 4, the computing system receives an intermediate target 1 from the user. The user may specify one or more positional values for the intermediate target 1. The user may, for example, select a point on a graphical user interface to specify the intermediate target 1. The user may provide one or more positional values for the intermediate target 1. The user may select a point on the planned trajectory 410 and drag the point to a different location to create the intermediate target 1. The user may enter one or more coordinate values for the intermediate target 1. In one embodiment, the user may enter desired values for a survey at the intermediate target 1 in order to provide the position values. The computing system may identify the position selected by the user on a graphical user interface and associate that position with a number of different position values representing its location.

In one embodiment, the computing system may display one or more of the positional values for the intermediate target 1 in an editable format. For example, in an embodiment where the user drags and drops a location from the planned trajectory 410 to a new location to create an intermediate target 1, the computing system may display the positional values associated with the location the user set graphically for the intermediate target 1. In such an embodiment, the user may create a first 'estimate' of the position of the intermediate target 1 graphically and then edit the positional values for the intermediate target 1 to refine its position.

After receiving the intermediate target 1, the computing system may generate a candidate correctional trajectory. In embodiments where the user provides an intermediate target 1 and one or more child intermediate targets (such as 1.2 and 1.2.1) the candidate correctional trajectory may be made up of a number of segments. For example, the candidate correctional trajectory 420.1 includes intermediate targets 1, 1.2, and 1.2.1. The candidate correctional trajectory 420.2 includes intermediate targets 1, 1.1, and 1.1.2. In embodiments, such as the one shown, where the candidate correctional trajectory passes through multiple intermediate targets, the candidate correctional trajectory may be made up of multiple segments such as the illustrated segment 414.

The user may also specify additional intermediate targets at the same hierarchical level. Although not illustrated, it will be appreciated that a user could specify an intermediate target '2' at the same hierarchical level as intermediate target 1. In such an embodiment, both intermediate targets 1 and 2 are children of the current position 402. The computing system may create candidate correctional trajectories for each of the one or more additional intermediate targets at the same hierarchical level.

As noted above, FIG. 4 illustrates that intermediate target 1 has child intermediate targets 1.1 and 1.2. Child intermediate target 1.1 itself has a child 1.1.2, and child intermediate target 1.2 has a child 1.2.1. The computing system may be configured to generate candidate correctional trajectories for each of the one or more additional child intermediate targets set by the user. In FIG. 4, this results in candidate correctional trajectory 420.1 and 420.2 respectively.

In one embodiment, the computing system requires that the user respect one or more of the target locations 404 as specified in the well plan. In such an embodiment, the computing system would not, for example, allow the user to create a candidate correctional trajectory that does not reach the target location 404. The computing system may not require that the user set intermediate targets all the way to the target locations 404 specified in the well plan; it may, for example, allow the user to create a candidate correctional trajectory to get back on the planned trajectory 410 (as shown in FIG. 4) provided the user is not bypassing any target locations 404 in instances where the well plan includes multiple target locations 404.

In certain embodiments, the computing system validates each segment of the candidate correctional trajectory. The computing system may, for example, indicate whether the tools have sufficient motor yield to execute the segment. If the segment fails validation due to the inability of the tools to successfully construct that segment, the computing system may provide a notification and require the user to select a different intermediate location. The system may notify the user where no drilling parameters can be used to reach the intermediate target and thus is not achievable.

The computing system may also enforce one or more constraints specified in the well plan. The well plan may, for example, specify acceptable limits for tool operation, dog leg severity, or set other constraints. The computing system may automatically extract the constraints from the well plan. In such an embodiment, if the candidate correctional trajectory violates one or more constraints, the computing system may provide a notification and require the user to select a different intermediate location.

The computing system may also present one or more drilling parameters to reach the intermediate target in an editable format. In one embodiment, for multi-segment candidate correctional trajectories, the drilling parameters are presented for each segment. While, for simplicity, the discussion below assumes a single segment candidate correctional trajectory, the same approach may be applied to a multi-segment candidate correctional trajectory. For example, the computing system may present values for motor yield, dog leg severity (DLS), build rate, turn rate, and others for the segment 414. The drilling parameters displayed may vary depending on tools and equipment in use; for example, the drilling parameters may vary depending on whether the directional drilling is being done using a motor or an RSS.

The computing system may present these drilling parameters for the candidate correctional trajectory to the user in an editable format. In response to receiving edits to the drilling parameters for the candidate correctional trajectory, the computing system may calculate an updated position for the intermediate target using the edited drilling parameters and update the position for the user.

The computing system may further provide the user with the option to select the candidate correctional trajectory and update the well plan using the selected candidate correctional trajectory.

This approach may allow the directional drilling team to more thoroughly explore different candidate trajectories to return the BHA to the planned trajectory 410 and evaluate the impact of the different options. As such, the approach can allow the directional drilling team to move ahead with greater confidence in their decisions and their ability to successfully construct the well.

Figure 5:
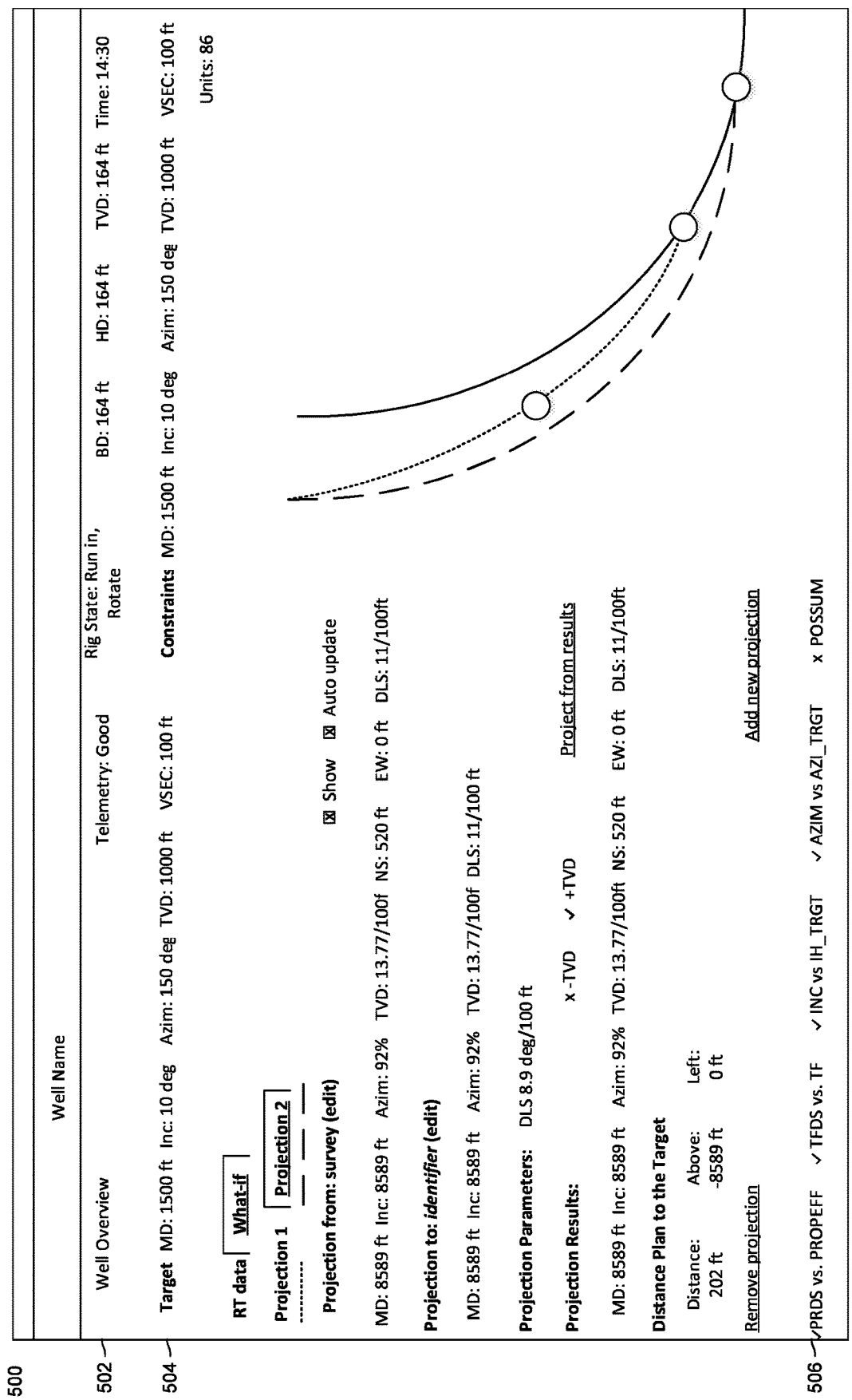
FIG. 5 illustrates one example of a user interface that may be used to allow a user to explore one or more options to return a BHA to a planned trajectory.

FIG. 5 illustrates one embodiment of a graphical user interface (GUI) 500 for allowing the user to create candidate correctional trajectories. FIG. 5 illustrates a top section 502 that includes overview information for the well being drilled. It may, for example, include information about the status of the telemetry, the rig state, bit depth, hole depth, true vertical depth, and other values. In the embodiment shown in FIG. 5, the bottom of the GUI 506 shows one or more key performance indicators (KPIs) for well construction.

The GUI may also present information about the next target specified in the well plan and the constraints 504. FIG. 5 also illustrates multiple tabbed areas. One tab is "RT data" or real time data. The real time data tab may illustrate information about the real-time performance during well construction and include information relating to various drilling parameters, BHA position, and other data to assist the user in understanding the real time state of the well construction and the tools.

The active tab in FIG. 5 is entitled 'What-if' and presents the user with options to investigate options in well construction. The user in this instance has two candidate correctional trajectories, or 'projections' in the GUI, under consideration. Data for projection 2 is active in the display. In one embodiment, the computing system creates a new tab for each new candidate correctional trajectory under consideration.

In the depicted embodiment, the user is presented with a "projection from" option. The user may select the 'edit' option to indicate where the projection should begin. In one embodiment, the projection from menu option presents a list of previous surveys and the user can select a survey as a starting point. In instances where the drilling system collects continuous position data for the BHA the user may select the to use the continuous position information as the starting point.

The user, in the instance illustrated in FIG. 5, has created one intermediate target for projection 2. In response to the user creating the intermediate target, the computing system computes and display associated drilling parameters for the user. In the example shown, the GUI shows position data for the 'projection from' point and for the 'projection to' point. These different values may be presented in an editable format such that the user can adjust one or more of the position data fields. As discussed above, this may allow the user to refine the positions for either the starting point or the end point.

The GUI may also display one or more drilling parameters (referred to as projection parameters in the GUI). In the displayed embodiment, the projection parameter is the dog leg severity. The user may edit one or more of the projection parameters. In one embodiment, the user may select a button to trigger a recalculation of the projection results and location of the intermediate target based on the updated drilling parameters. In another embodiment, as shown, the user may select an 'auto update' option that automatically recalculates the projections in response to the user changing one or more of the position data and the drilling parameters.

The user may also have the option to set one or more additional constraints for the candidate correctional trajectory. In the example shown, the user has set constraint values for the TVD values. The user has set lower and upper limits. The results of the projection indicate that the projection satisfies the upper constraint limit for TVD (as indicated by the check mark) but fails to satisfy the lower limit (as indicated by the 'x' mark).

The GUI further provides the option to remove projections or add a new projection, thus creating a new segment in the candidate correctional trajectory as described above. The GUI may also show the different projections along with the planned trajectory (shown by the solid black line). The GUI may, in some embodiments, include markers indicating the positions from the positional data, whether by creating markers at each survey point, markers representing the continuous position data, or other.

The GUI may further, as shown, allow a user to zoom in on a particular section of the graphical representation of the planned trajectory and the one or more candidate correctional trajectories. While FIG. 5 illustrates a vertical section view, other views (such as a top view) may also be included as part of the display.

Figure 6A:
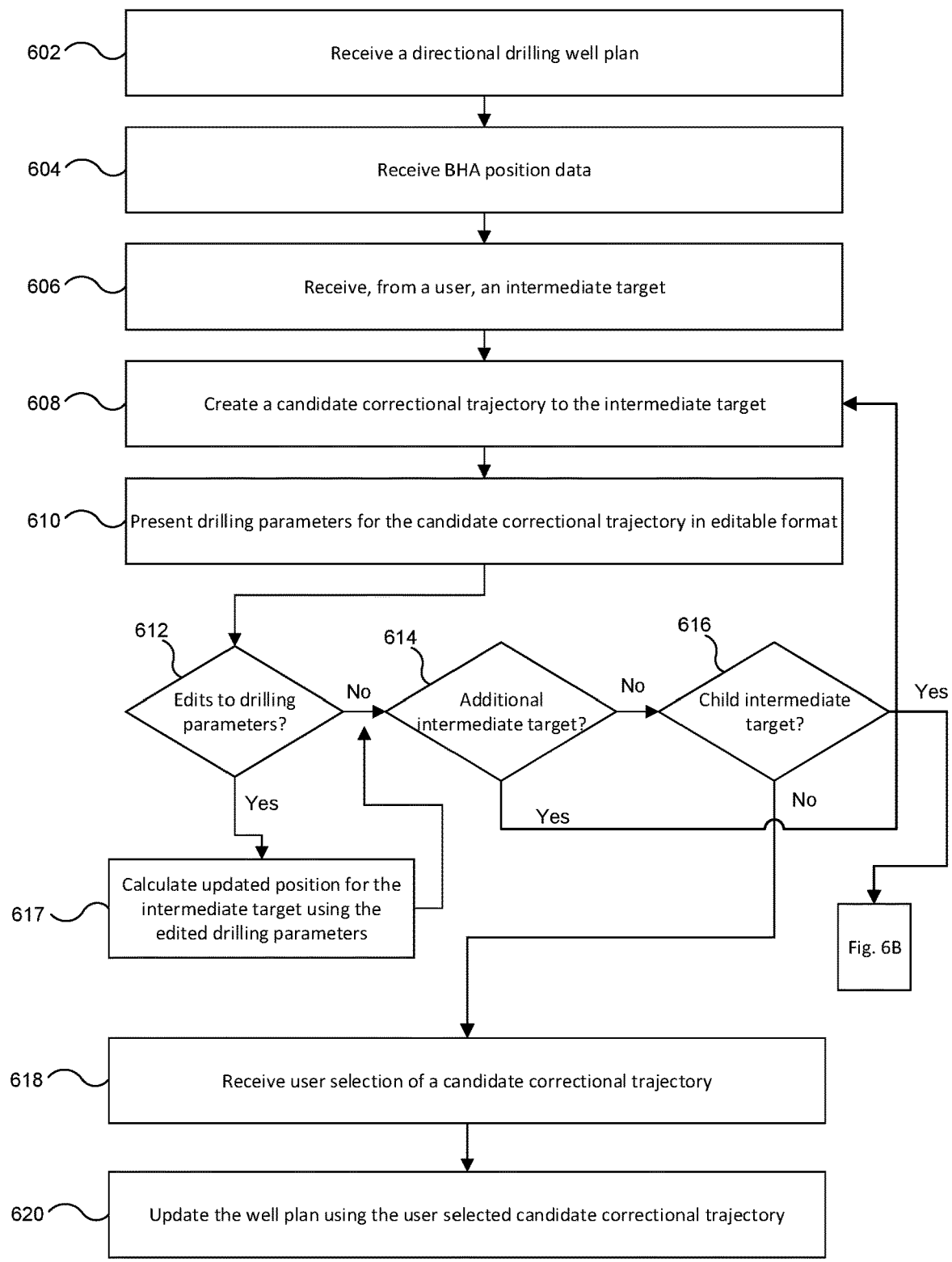
FIGS. 6A-6B are a flowchart of one embodiment of a method for updating a well plan with a correctional trajectory.
Figure 6B:
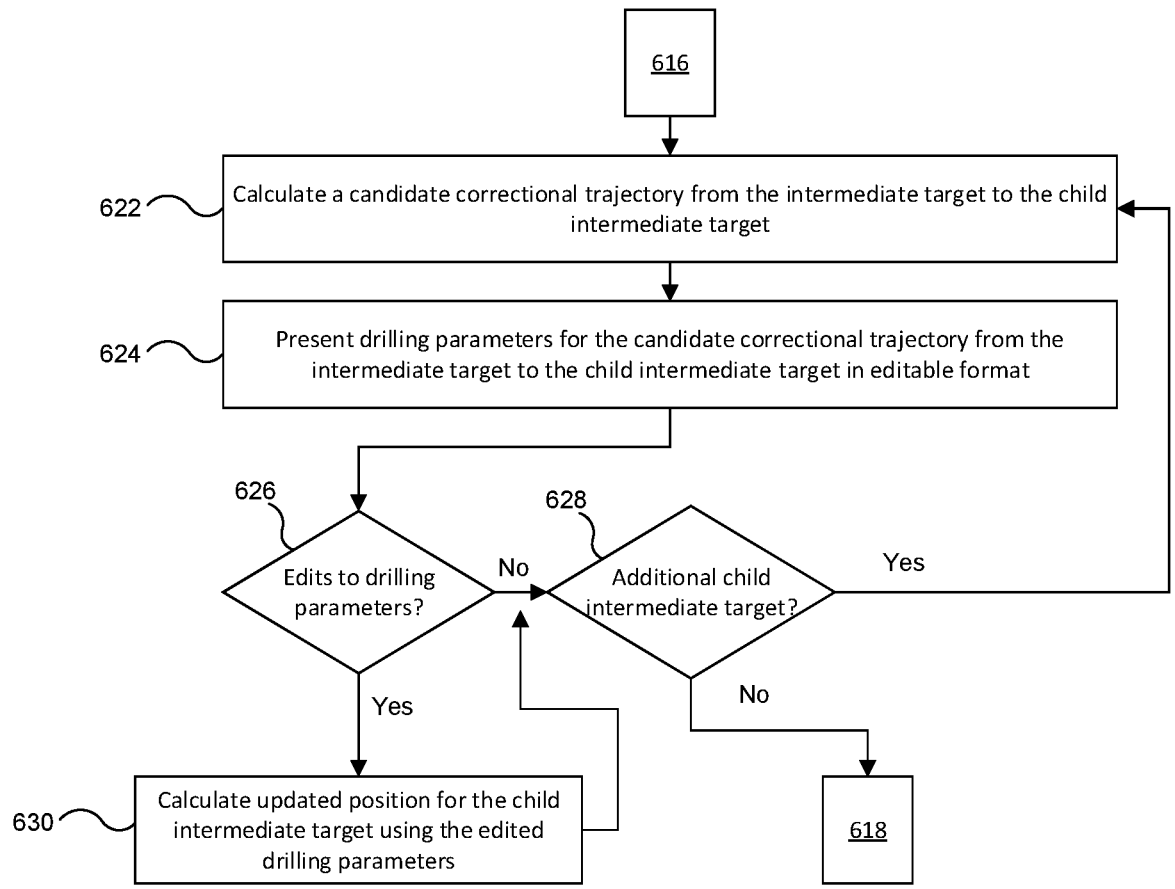

FIGS. 6A-6B are a flowchart of one embodiment of a method for updating a well plan with a correctional trajectory. The method begins with receiving 602 a well plan for a well to be directionally drilled. The well plan, as discussed above, will include one or more target locations.

The method may also include receiving 604 positional data for a bottom hole assembly (BHA) during construction of the well and receiving 606, from a user, an intermediate target.

While the above examples discuss the use of the intermediate target as part of a process for returning a BHA to the planned trajectory, in other embodiments the user may be able to create the intermediate targets and perform the analysis described herein even when the BHA is on the planned trajectory. The directional drilling may, for example, anticipate potential problems in a section of the well and want to investigate alternative trajectories to avoid or mitigate the problems in that section. In such an embodiment, the candidate correctional trajectory may take the BHA off the planned trajectory for a certain distance and then return it to reach one or more target locations specified in the well plan.

The method may also involve creating 610 a candidate correctional trajectory that passes through the intermediate target specified by the user. This creation may involve determining one or more drilling parameters to reach the intermediate target and presenting 610 the drilling parameters for the candidate correctional trajectory in editable format.

The method may involve determining 612 whether there are edits to the drilling parameters. If yes, the method may involve 617 calculating an updated position for the intermediate target using the edited drilling parameters and displaying the updated position to the user.

If no, the method may involve determining 614 if there are additional intermediate targets. If yet, the steps from 608 may be repeated until all additional intermediate targets have been included. Once all additional intermediate targets are considered, the method may involve determining 616 whether there are child intermediate targets. If no, the method may involve providing the user with an option to select the candidate correctional trajectory and receiving 618 the user's selection. The method may end with updating 620 the well plan using the selected candidate correctional trajectory.

As shown in FIG. 6B, if there are child intermediate targets, the method may involve calculating 622 a candidate correctional trajectory from the intermediate target to the child intermediate target and presenting 624 the drilling parameters for the candidate correctional trajectory from the intermediate target to the child intermediate target (e.g., a segment) in editable format. The method may determine 626 whether there are edits to the drilling parameters. If so, the method may include calculating an updated position for the child intermediate target using the edited drilling parameters. The method may involve determining 628 whether there are additional child intermediate targets. If so, the process may repeat at 622 for the child intermediate targets until all additional child intermediate targets are accounted for and the method continues at 618. While the above method make reference to one level of child intermediate targets, the approach may be extended to any number of additional hierarchical levels of intermediate targets.

As noted above, in certain embodiments the method may involve determining a current position of the BHA using the BHA position data, comparing the current position of the BHA to the expected position of the BHA as determined from the well plan, and determining whether the current position of the BHA is off the planned trajectory by a threshold amount. In certain embodiments, the method may automatically creating a generated correctional trajectory to move the BHA from the current position to the planned trajectory and presenting the generated correctional trajectory to the user.

The method may also include notifying the user if the computing system cannot identify drilling parameters that can be used to reach the intermediate point. In certain embodiments, the method may also require that the selected candidate correctional trajectory pass through each target location specified in the well plan.

CONCLUSION

The embodiments disclosed in this disclosure are to help explain the concepts described herein. This description is not exhaustive and does not limit the claims to the precise embodiments disclosed. Modifications and variations from the exact embodiments in this disclosure may still be within the scope of the claims.

Likewise, the steps described need not be performed in the same sequence discussed or with the same degree of separation. Various steps may be omitted, repeated, combined, or divided, as appropriate. Accordingly, the present disclosure is not limited to the above-described embodiments, but instead is defined by the appended claims in light of their full scope of equivalents. In the above description and in the below claims, unless specified otherwise, the term "execute" and its variants are to be interpreted as pertaining to any operation of program code or instructions on a device, whether compiled, interpreted, or run using other techniques.

Certain of the claims below may include numbered lists. The numbers are provided as an organizational tool to aid in readability. The numbers themselves do not indicate an expected order of configuration or execution or otherwise have substantive meaning. For United States applications, the claims that follow do not invoke section 112(f) unless the phrase "means for" is expressly used together with an associated function.

What is claimed is:

1. A drilling system comprising:
    a drillstring comprising a bottom hole assembly at one end of the drillstring for drilling a well;
    a computing system comprising at least one processor and at least one memory unit, the computing system configured to:
        prior to commencing drilling, receive a directional drilling well plan for the well, the well plan comprising:
            a set of instructions to reach a target location for the well using the drilling system; and
            a planned trajectory to reach the target location;
        receive bottom hole assembly position data from one or more sensors during construction of the well, the bottom hole assembly position data comprising one or more of survey data for the bottom hole assembly and continuous position data for the bottom hole assembly;
        determine a current position of the bottom hole assembly using the bottom hole assembly position data;
        compare the current position of the bottom hole assembly to the planned trajectory;
        in response to determining that the current position of the bottom hole assembly is off the planned trajectory by a threshold amount:
            receiving, from a user, an intermediate target;
            creating a candidate correctional trajectory that passes through the intermediate target specified by the user, the candidate correctional trajectory further comprising one or more drilling parameters to reach the intermediate target;
            presenting the one or more drilling parameters for the candidate correctional trajectory to the user in editable format;
            in response to receiving one or more edits to the one or more drilling parameters for the candidate correctional trajectory, calculating an updated position for the intermediate target using the edited drilling parameters and displaying the updated position to the user;
            providing the user an option to select the candidate correctional trajectory; and
            updating the well plan using the selected candidate correctional trajectory.

2. The drilling system of claim 1, the computing system further configured to, in response to determining that the current position of the bottom hole assembly is off the planned trajectory by the threshold amount:
    automatically create a generated correctional trajectory to move the bottom hole assembly from the current position to the planned trajectory; and
    present the generated correctional trajectory to the user.

3. The drilling system of claim 1, further comprising notifying the user in response to identifying no drilling parameters that can be used to reach the intermediate target.

4. The drilling system of claim 1, wherein receiving the intermediate target comprises receiving one or more positional values for the intermediate target from the user.

5. The drilling system of claim 1, wherein receiving the intermediate target comprises:
    identifying a position selected by the user on a graphical user interface;
    associating the position selected by the user with a plurality of position values;
    displaying the position values for the intermediate target in editable format; and
    updating the position of the intermediate target in response to receiving edited position values.

6. The drilling system of claim 1, the computing system further configured to:
    receive one or more additional intermediate targets at a same hierarchical level; and
    create a candidate correctional trajectory for each of the one or more additional intermediate targets at the same hierarchical level.

7. The drilling system of claim 1, the computing system further configured to:
    receive one or more child intermediate targets for the candidate correctional trajectory; and
    create a candidate correctional trajectory for each of the one or more additional child intermediate targets.

8. The drilling system of claim 1, wherein the computing system is separate from and communicatively connected to a rig control system through a physical connection.

9. The drilling system of claim 1, wherein the computing system is at a separate, remote location from the rig control system and communicatively connected to the rig control system through a wireless connection.

10. A non-transitory computer-readable medium storing instructions that, when executed by a processor, cause the processor to perform operations, the operations comprising:
receiving a well plan for a well to be directionally drilled, the well plan including one or more target locations;
receiving positional data for a bottom hole assembly during construction of the well;
receiving, from a user, an intermediate target;
creating a candidate correctional trajectory that passes through the intermediate target specified by the user, the candidate correctional trajectory further comprising one or more drilling parameters to reach the intermediate target;
presenting the one or more drilling parameters for the candidate correctional trajectory to the user in editable format;
in response to receiving one or more edits to the one or more drilling parameters for the candidate correctional trajectory, calculating an updated position for the intermediate target using the edited drilling parameters and displaying the updated position to the user;
providing the user an option to select the candidate correctional trajectory; and
updating the well plan using the selected candidate correctional trajectory.

11. The non-transitory computer-readable medium of claim 10, the operations further comprising:
determining a current position of the bottom hole assembly using the bottom hole assembly positional data;
comparing the current position of the bottom hole assembly to an expected position of the bottom hole assembly, wherein the expected position is determined from the well plan; and
determining whether the current position of the bottom hole assembly is off a planned trajectory by a threshold amount.

12. The non-transitory computer-readable medium of claim 11, the operations further comprising:
automatically creating a generated correctional trajectory to move the bottom hole assembly from the current position to the planned trajectory; and
presenting the generated correctional trajectory to the user.

13. The non-transitory computer-readable medium of claim 10, the operations further comprising notifying the user in response to identifying no drilling parameters that can be used to reach the intermediate target.

14. The non-transitory computer-readable medium of claim 10, the operations further comprising receiving from the user a starting point for the candidate correctional trajectory, wherein the starting point is one of:
a last survey position; and
a last continuous position value.

15. A method for updating a well plan for a directional well, the method comprising:
receiving a well plan for a well to be directionally drilled, the well plan including one or more target locations;
receiving positional data for a bottom hole assembly during construction of the well;
receiving, from a user, an intermediate target;
creating a candidate correctional trajectory that passes through the intermediate target specified by the user, the candidate correctional trajectory further comprising one or more drilling parameters to reach the intermediate target;
presenting the one or more drilling parameters for the candidate correctional trajectory to the user in editable format;
in response to receiving one or more edits to the one or more drilling parameters for the candidate correctional trajectory, calculating an updated position for the intermediate target using the edited drilling parameters and displaying the updated position to the user;
providing the user an option to select the candidate correctional trajectory; and
updating the well plan using the selected candidate correctional trajectory.

16. The method of claim 15, further comprising:
determining a current position of the bottom hole assembly using the bottom hole assembly positional data;
comparing the current position of the bottom hole assembly to an expected position of the bottom hole assembly, wherein the expected position is determined from the well plan; and
determining whether the current position of the bottom hole assembly is off the planned trajectory by a threshold amount.

17. The method of claim 16, further comprising:
automatically creating a generated correctional trajectory to move the bottom hole assembly from the current position to the planned trajectory; and
presenting the generated correctional trajectory to the user.

18. The method of claim 15, further comprising notifying the user in response to identifying no drilling parameters that can be used to reach the intermediate target.

19. The method of claim 15, further comprising receiving from the user a starting point for the candidate correctional trajectory, wherein the starting point is one of:
a last survey position; and
a last continuous position value.

20. The method of claim 15, further comprising requiring that the selected candidate correctional trajectory pass through each target location specified in the well plan.

* * * * *